US007909142B2

(12) United States Patent
Noel (10) Patent No.: US 7,909,142 B2
(45) Date of Patent: Mar. 22, 2011

(54) BRAKING DEVICE FOR ELEVATING PLATFORM ASSEMBLY

(75) Inventor: Gérard Noel, Sainte-Julie (CA)

(73) Assignee: Hydro-Mobile Inc., L'Assomption, Quebec (CA)

( * ) Notice: Subject to any disclaimer, the term of this patent is extended or adjusted under 35 U.S.C. 154(b) by 1091 days.

(21) Appl. No.: 11/419,229

(22) Filed: May 19, 2006

(65) Prior Publication Data

US 2008/0271961 A1 Nov. 6, 2008

(51) Int. Cl.
*B66B 5/04* (2006.01)
*F16D 59/00* (2006.01)

(52) U.S. Cl. ......... 187/373; 187/376; 188/136; 188/180

(58) Field of Classification Search .......... 187/270, 187/352, 356, 373, 376; 188/82.2, 82.8, 188/233, 135, 136, 139, 166, 180, 187; *F16D 51/60, F16D 59/00*
See application file for complete search history.

(56) References Cited

U.S. PATENT DOCUMENTS

| 3,924,710 | A | | 12/1975 | Shohet |  |
|---|---|---|---|---|---|
| 3,934,682 | A | * | 1/1976 | Hedstrom | 187/352 |
| 3,967,703 | A | * | 7/1976 | Martin | 187/270 |
| 4,257,494 | A | * | 3/1981 | Frankel | 187/373 |
| 4,258,832 | A | * | 3/1981 | Thorp | 188/184 |
| 4,531,617 | A | | 7/1985 | Martin et al. | |
| 4,856,623 | A | * | 8/1989 | Romig, Jr. | 188/180 |
| 5,224,570 | A | * | 7/1993 | Fromberg | 187/376 |
| 5,353,895 | A | | 10/1994 | Camack et al. | |
| 5,366,045 | A | * | 11/1994 | Liston | 187/376 |
| 6,082,506 | A | | 7/2000 | Huang et al. | |
| 6,193,026 | B1 | | 2/2001 | Sevilleja et al. | |
| 6,523,647 | B2 | | 2/2003 | Duplessis | |
| 6,719,101 | B2 | | 4/2004 | Hugel | |
| 6,830,132 | B1 | | 12/2004 | Kang et al. | |
| 6,988,593 | B2 | * | 1/2006 | Sánchez et al. | 187/376 |

FOREIGN PATENT DOCUMENTS

EP 0 073 659 5/1985
GB 2074673 A * 11/1981

* cited by examiner

*Primary Examiner* — Michael R Mansen
*Assistant Examiner* — Stefan Kruer
(74) *Attorney, Agent, or Firm* — Baker & Daniels LLP (57) ABSTRACT

A braking device for an elevated platform assembly comprising a platform moveable along a generally vertical mast supporting an upright rack comprises an input gear assembly in mating engagement with the rack, a centrifugal actuator communicating with the input assembly and a spring-loaded brake responsive to the centrifugal actuator. The spring-loaded brake engages the rack and arrests the platform when the platform descends the mast at a rate above an upper threshold limit.

30 Claims, 10 Drawing Sheets

BRAKING DEVICE FOR ELEVATING PLATFORM ASSEMBLY

FIELD OF THE INVENTION

The present invention relates generally to elevating working platform assemblies and in particular to a braking device for an elevating platform assembly and to an elevating platform assembly incorporating the same.

BACKGROUND OF THE INVENTION

Elongated working platforms are well known in the art and are commonly used during construction to support workers and equipment at desired elevations. Working platforms of this nature include for example, stationary scaffolding as well as moveable elevating platform assemblies. Although stationary scaffolding is useful, in many instances it is desired to change quickly the elevation of workers and equipment and thus, elevating platform assemblies are advantageous.

One known type of elevating platform assembly is disclosed in U.S. Pat. No. 6,523,647 to Duplessis and assigned to Hydro-Mobile Inc. of L'Assomption, Quebec, assignee of the subject application. This elevating platform assembly comprises an elongated platform that is supported at one end by a mast. A drive mechanism acts between the elongated platform and the mast. The drive mechanism includes a trolley moveable along the mast to which the elongated platform is secured. A motor is mounted on the trolley and drives pinions that cooperate with a rack secured to the mast. In this manner, the elongated platform can be moved upwardly and downwardly along the mast.

Safety is always an issue and so elevating platform assemblies of this nature are provided with emergency brakes to inhibit uncontrolled and/or undesired downward movement of the elongated platforms relative to the masts. For example, many such elevating platform assemblies are provided with emergency brakes that are activated when the rates of descent of the elongated platforms relative to the masts reach an upper threshold rate.

U.S. Pat. No. 6,082,506 to Huang et al. discloses a braking arrangement for an elevating work platform comprising a brake body, a C-shaped receiving device, a brake unit and a brake release handle. The brake arrangement allows only upward movement of the elevating work platform during normal operation. Downward movement of the elevating work platform is permitted only upon actuation of the brake release handle. The braking arrangement also provides an emergency stop in the event of a main cable or winding machine failure.

U.S. Pat. No. 4,531,617 to Martin et al. discloses an over-speed safety braking device comprising an input shaft, a rotary friction brake having a fixed part and a rotary part, a control device and a centrifugal activated structure. The centrifugal activated structure comprises a braking member which rotates with the input shaft when the speed of the input shaft is below an upper threshold speed limit. A weight is pivotally mounted on the braking member. A biasing spring is coupled to the weight member and is arranged to bias the weight member towards the axis of rotation of the input shaft when the speed of the input shaft is below the upper threshold speed limit and away from the axis of rotation of the input shaft when the speed of the input shaft is above the upper threshold speed limit.

Although prior art emergency brakes are satisfactory, improvements in braking mechanisms to ensure quick and reliable braking in an emergency situation are desired. It is therefore an object of the present invention to provide a novel braking device for an elevating platform assembly and to an elevating platform assembly incorporating the same.

SUMMARY OF THE INVENTION

According to one aspect there is provided a braking device for an elevating platform assembly, said elevating platform assembly comprising a platform moveable along a generally vertical mast supporting an upright rack, said braking device comprising:
   an input gear assembly in mating engagement with said rack;
   a centrifugal actuator communicating with said input gear assembly; and
   a spring-loaded brake responsive to said centrifugal actuator to engage said rack and arrest said platform when said platform descends said mast at a rate above an upper threshold limit.

In one embodiment, the spring-loaded brake comprises a braking rack to engage the rack on the mast. The centrifugal actuator times triggering of the spring-loaded brake so that the teeth of the braking rack cleanly mesh with the teeth of the rack on the mast. The braking device automatically resets as movement of the platform is arrested.

In one form, the centrifugal actuator comprises a drum assembly coupled to the input gear assembly and a trigger mechanism acting between the input gear assembly and the spring-loaded brake. The drum assembly causes the input gear assembly to release the trigger mechanism thereby to deploy the spring-loaded brake when centrifugal forces sensed by the drum assembly signify a rate of decent of the platform above the upper threshold limit. The drum assembly comprises a biased assembly rotatable with the input gear assembly. The input gear assembly comprises an input gear in mating engagement with the rack, a shaft coupled to the input gear and the biased assembly and a latch release mechanism responsive to movement of the biased assembly that occurs when the biased assembly overcomes the bias. The drum assembly comprises a notched inner surface that is engaged by the biased assembly when the biased assembly overcomes the bias. Engagement of the biased assembly and the notched inner surface causes rotation of the drum assembly and actuation of the latch release mechanism. The spacing of the notches on the inner surface of the drum assembly and the spacing of teeth of the input gear are substantially equal.

In one form, the spring-loaded brake comprises a linearly slidable push block acting on the braking rack. The push block presents an upwardly and forwardly inclined surface that acts on a complimentary surface of the braking rack. A low friction material acts between the inclined surface of the push block and the complimentary surface of the braking rack. The braking rack is slidable along the low friction material According to another aspect there is provided an elevating platform comprising:
   at least one mast;
   a vertical rack on said at least one mast;
   an elongate platform coupled to said at least one mast and moveable therealong;
   a drive mechanism acting between said platform and said mast to effect movement of said platform along said mast; and
   an emergency braking device on said platform and engaging said rack, said emergency braking device comprising:

an input gear assembly in mating engagement with said rack;

a centrifugal actuator communicating with said input gear assembly; and a spring-loaded brake responsive to said centrifugal actuator to engage said rack and arrest said platform when said platform descends said mast at a rate above an upper threshold limit.

The braking device provides advantages in that triggering of the braking rack is synchronized with the rack on the mast so that the teeth of the braking rack and the teeth of the rack on the mast cleanly mesh. This avoids potential free fall resulting from abutting teeth, as opposed to meshing teeth, and avoids breaking of teeth. Further, by using inclined surfaces to urge the braking rack into engagement with the rack on the mast, better interaction between the teeth of the braking rack and the teeth of the rack on the mast is achieved.

BRIEF DESCRIPTION OF THE DRAWINGS

Embodiments will now be described more fully with reference to the accompanying drawings in which.

DETAILED DESCRIPTION OF THE PREFERRED EMBODIMENTS

Figure 1:
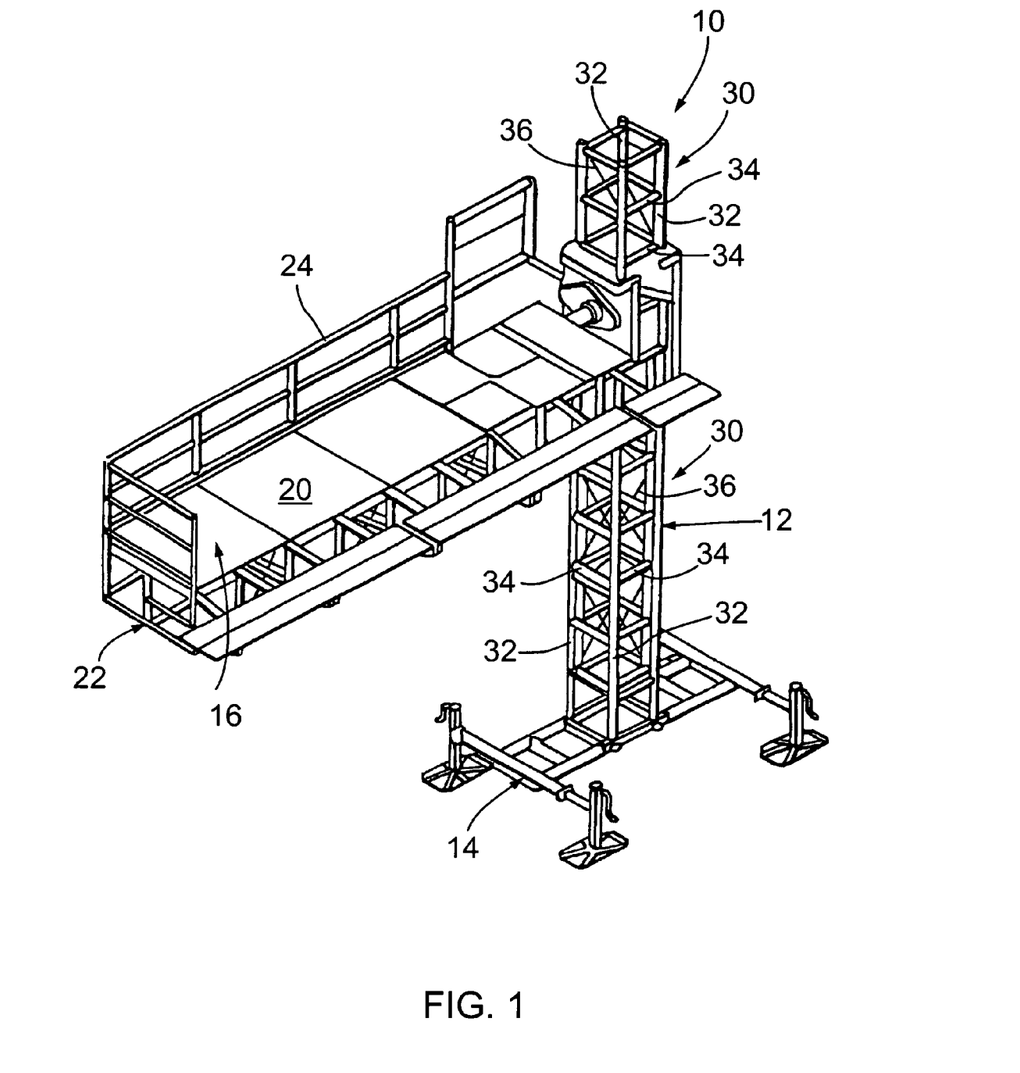
FIG. 1 is an isometric view of an elevating platform assembly.

Referring now to FIG. 1, an elevating platform assembly is shown and is generally identified by reference numeral 10. Elevating platform assembly 10 is of the type disclosed in U.S. Pat. No. 6,523,647 to Duplessis and assigned to Hydro-Mobile Inc., assignee of the subject application, the content of which is incorporated herein by reference. As can be seen, elevating platform assembly 10 includes a generally vertical mast 12 that is supported by a base assembly 14 resting on a ground surface. An elongate platform 16 extends from one side of the mast 12 generally at a right angle. The elongate platform 16 includes a generally planar work surface 20 secured to an underlying supporting framework 22. Guard rails 24 surround the work surface 20. The elongate platform 16 is coupled to the mast 12 in a manner that permits the elongate platform to move vertically along the mast 12 thereby to allow the work surface 20 to be positioned at desired elevations. The mast 12 is formed from a series of stacked, box-type mast sections 30 and includes four vertical corner rails 32 joined by horizontal crossbars 34 at vertically spaced locations. A plurality of diagonal cross-members 36 extends between the rails 32 and the horizontal crossbars 34 to provide additional support to the mast 12. A vertical rack 40 is secured to the horizontal crossbars 34 on one side of the mast 12 by suitable fasteners (not shown).

A drive mechanism (not shown) acts between the elongate platform 16 and the rack 40. The drive mechanism includes a trolley moveable along the mast 12 to which the elongate platform 16 is secured. A motor is mounted on the trolley and drives pinions that cooperate with the rack 40 on the mast 12. The drive mechanism is responsive to a user control panel to enable a user to control movement of the elongate platform 16 up and down the mast 12. For safety, an emergency braking device, as will be described, is provided on the elongate platform 16 and is also coupled to the rack 40. The emergency braking device typically remains in a neutral disengaged condition but moves to an engaged brake condition to arrest movement of the elongate platform 16 along the mast 12 when the rate of decent of the elongate platform 16 along the mast 12 exceeds an upper threshold limit. The emergency braking device will now be described with particular reference to FIGS. 2 to 5.

Figure 2:
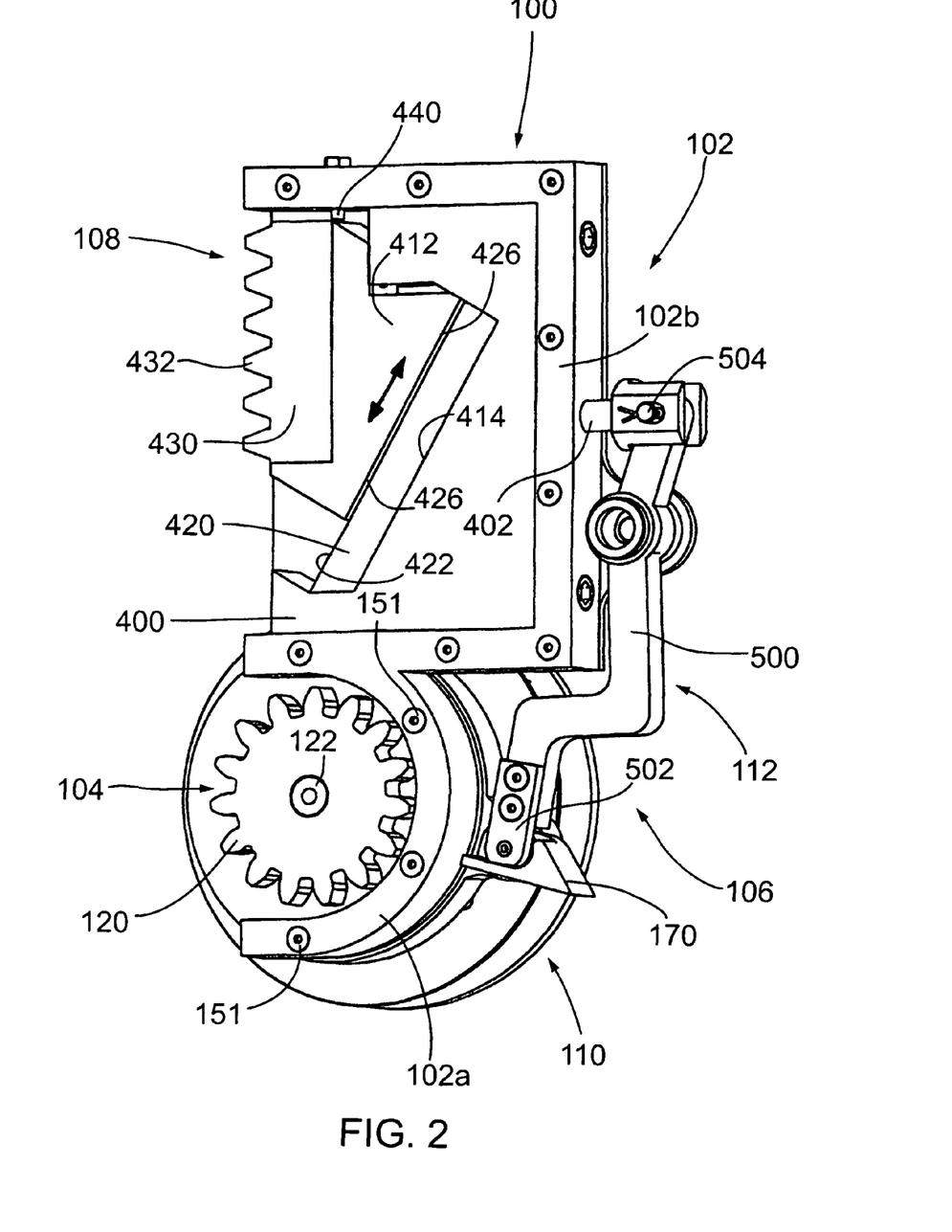
FIG. 2 is an isometric view of an emergency braking device for the elevating platform assembly of FIG. 1.
Figure 5:
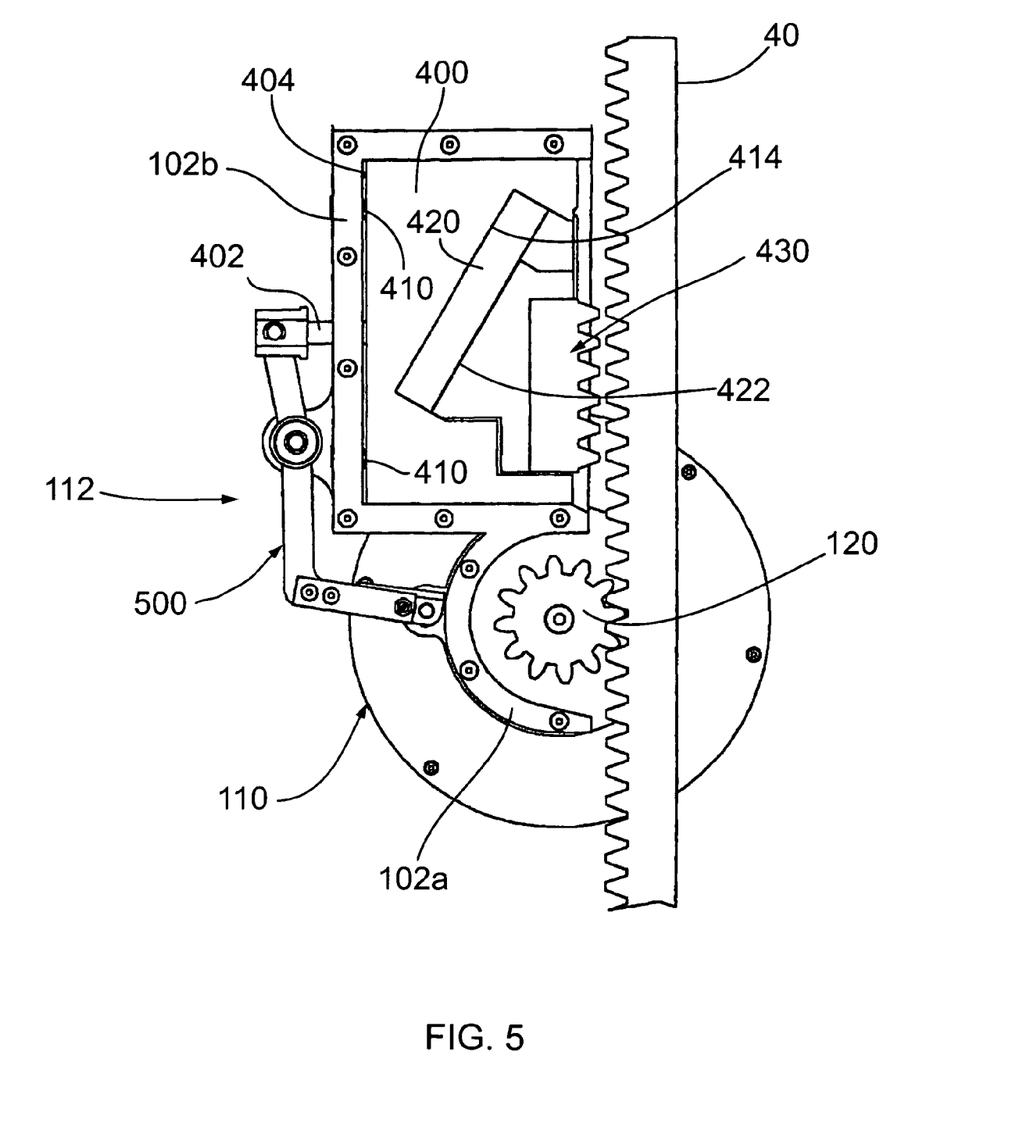
FIG. 5 is a side elevational view of the emergency braking device of FIG. 2 in a neutral disengaged condition.

Turning now to FIGS. 2 and 5, the emergency braking device in its neutral disengaged condition is illustrated and is generally identified by reference numeral 100. As can be seen, emergency braking device 100 comprises a frame 102 secured to the elongate platform 16 adjacent the rack 40 on the mast 12. Frame 102 comprises a lower, curved C-shaped section 102a and an upper, square C-shaped section 102b. An input gear assembly 104 is mounted on the lower frame section 102a and communicates with the rack 40 to allow the rate of descent at which the elongate platform 16 moves along the mast 12 to be sensed. The input gear assembly 104 is coupled to a centrifugal actuator 106 that communicates with a spring-loaded brake 108 mounted on the upper frame section 102b above the input gear assembly 104. The centrifugal actuator 106, which comprises a drum assembly 110 and a trigger mechanism 112, triggers the spring-loaded brake 108 when the rate of decent of the elongate platform 16 along the mast 12 exceeds the upper threshold limit causing the spring-loaded brake 108 to move into mating engagement with the rack 40 thereby to arrest movement of the elongate platform 16 relative to the mast 12. In this embodiment, the upper threshold limit is in the range of between 40 to 50 ft/min. Those of skill in the art will however appreciate that the upper threshold limit can be set to basically any desired maximum rate of descent. Once triggered, the emergency braking device 100 automatically resets so that upward movement of the elongate platform 16 along the mast 12 following triggering of the emergency braking device 100 returns the emergency braking device to its neutral disengaged condition.

Figure 3:
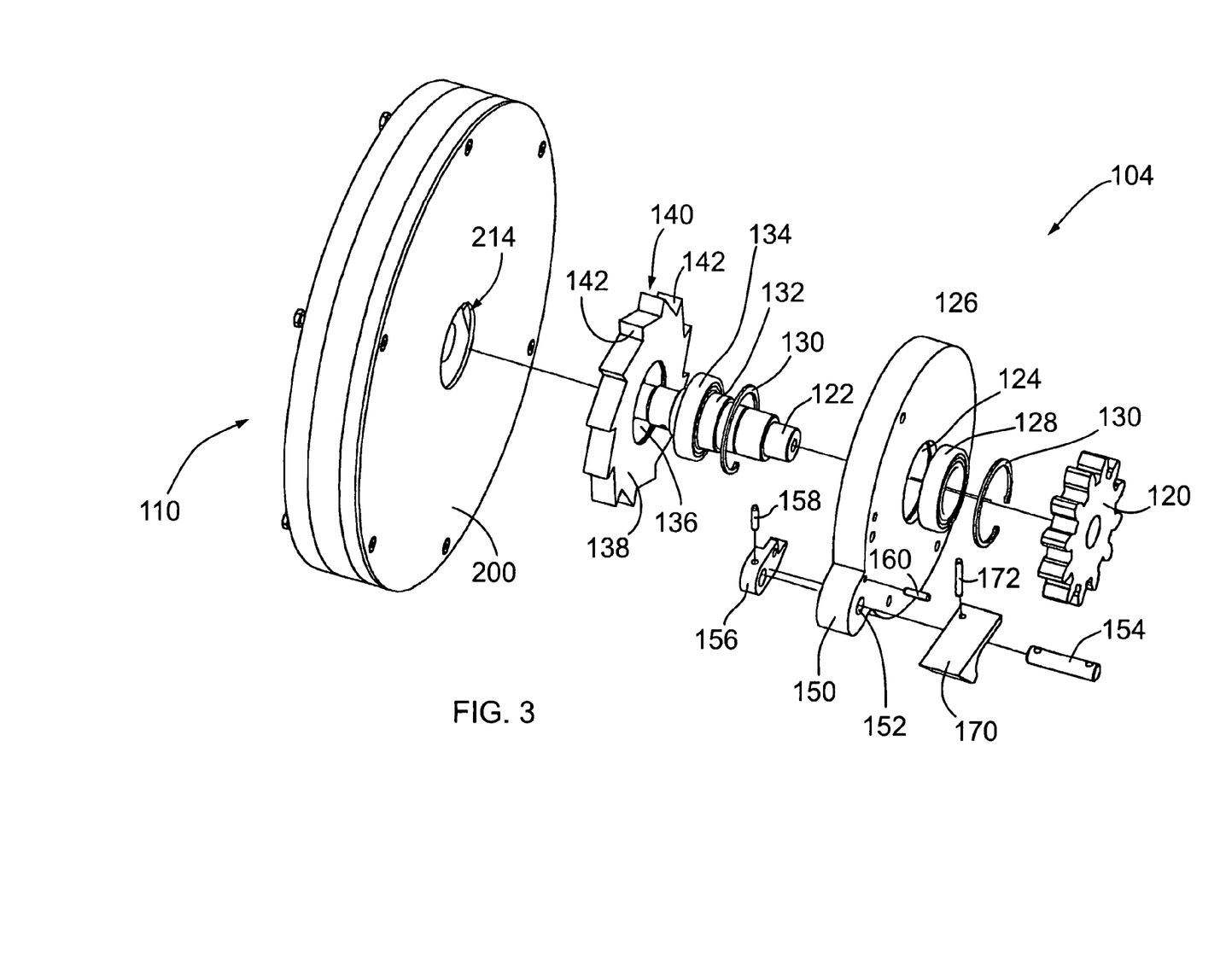
FIG. 3 is a partly exploded, perspective view of an input gear assembly and drum assembly forming part of the emergency braking device of FIG. 2.

Turning now to FIG. 3, the input gear assembly 104 is better illustrated. As can be seen, input gear assembly 102 comprises an input gear 120 secured to one end of a shaft 122 that passes through a central bore 124 in a lever actuator 126. A bearing 128 surrounds the shaft 122 within the bore 124 to facilitate rotation of the shaft 122 relative to the lever actuator 126. Circlips 130 surround the shaft 122 on opposite sides of the bearing 128. Shaft 122 also passes through a sleeve 132. A bushing 134 surrounds the sleeve 132 and is accommodated by the central bore 136 provided in a trigger wheel 138. The outer surface 140 of the trigger wheel 138 is notched to define a series of steps 142 about its circumference. The shaft 122 and sleeve 132 also extend into the drum assembly 110.

The lever actuator 126 is in the form of a disc having a projection 150 on its outer surface and is secured to the lower frame section 102a by fasteners 151 (see FIG. 2). The projection 150 has central passage 152 provided therein that rotatably accommodates a shaft 154. The shaft 154 extends beyond opposite sides of the projection 150. A pawl 156 is fixed to one end of the shaft 154 via a retaining pin 158 that passes through aligned holes in the pawl 156 and shaft 154 and via a retaining pin 160 that passes through aligned holes in the projection 150 and pawl 156. The pawl 156 is in alignment with the trigger wheel 138 and contacts its notched outer surface 140. A latch 170 having a catch 170a is fixed to the other end of the shaft 154 via a retaining pin 172 that passes through aligned holes in the latch 170 and shaft 154. As the pawl 156 and latch 170 are fixed to the shaft 154, pivoting of the pawl 156 results in pivoting of the latch 170.

Figure 4:
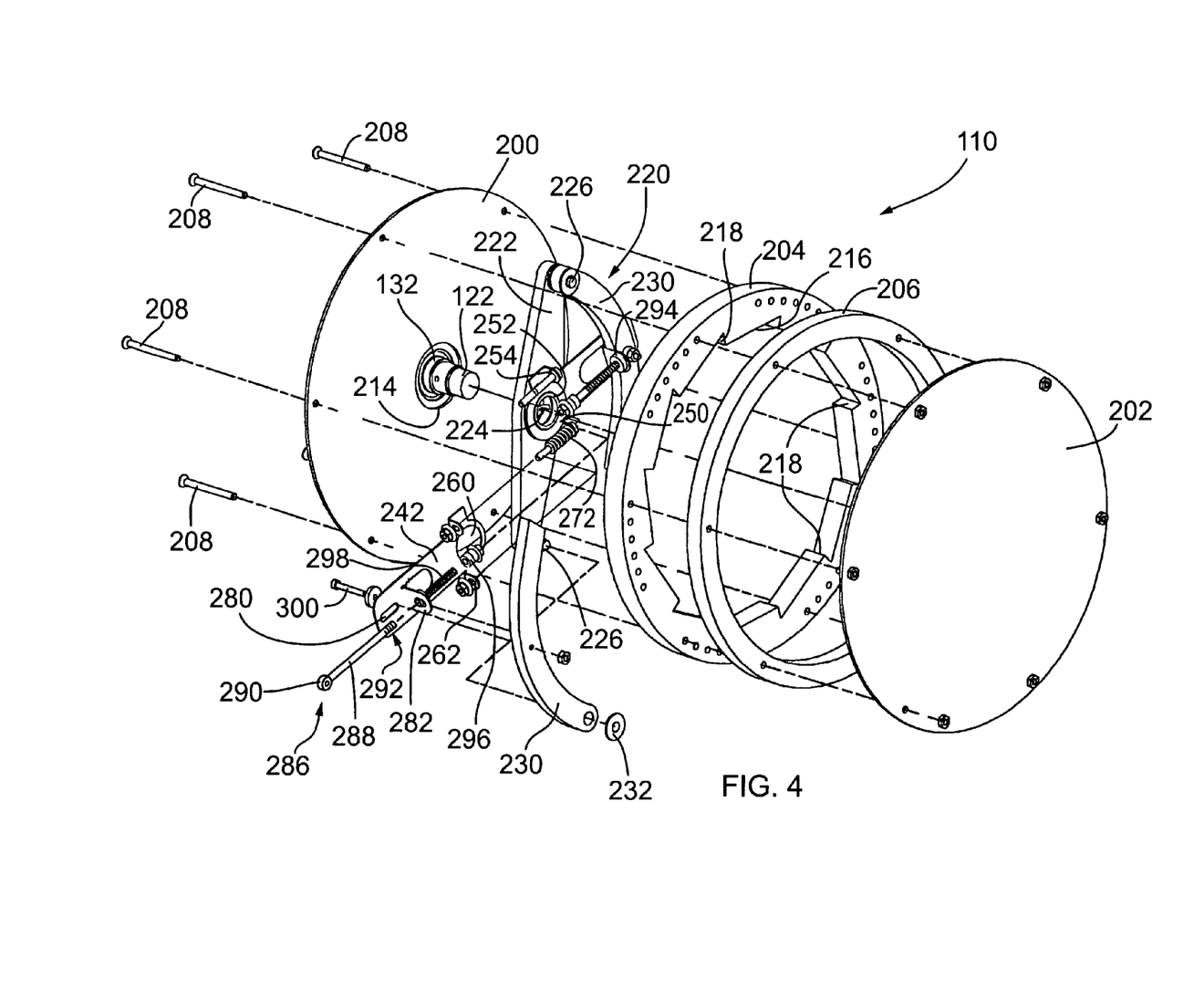
FIG. 4 is an exploded perspective view of the drum assembly of FIG. 3.
Figure 9A:
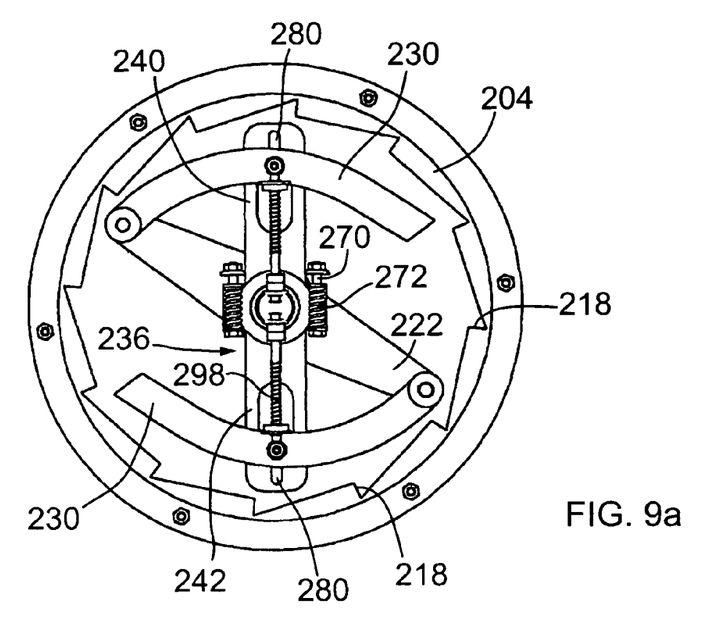
FIGS. 9a and 9b are sectional views of the drum assembly of FIG. 3 when the emergency braking device is in the neutral disengaged condition and in the engaged brake condition respectively.

The drum assembly 110 is best illustrated in FIGS. 4 and 9a. As can be seen, drum assembly 110 comprises a front face plate 200 and a rear face plate 202 separated by a pair of rings 204 and 206. Fasteners 208 in the form of nuts and bolts pass through aligned circumferentially spaced holes in the front and rear face plates 200 and 202 and the rings 204 and 206 to secure the front and rear face plates and the rings together. Face plate 200 has a central opening 214 provided therein and receives the shaft 122 and sleeve 132. The inside surface 216 of the ring 204 is notched similar to the trigger wheel 138 to define a series of steps 218.

A spring-biased finger assembly 220 is mounted on the end of the shaft 122 within the drum 210 and is positioned such that it is encircled by the notched inner surface 216 of the ring 204. The spring-biased finger assembly 220 comprises a propeller 222 secured to the shaft 122 via a retaining pin 224 that passes through aligned holes in the propeller 222 and shaft 122. Cylindrical projections 226 adjacent opposite ends of the propeller 222 extend forwardly of the propeller. Each cylindrical projection 226 passes through one end of a curved finger 230 that is rotatable about the cylindrical projection. A retaining clip 232 is pressed onto the end of each cylindrical projection 226 to retain the curved finger 230 on the propeller 222. A finger restrainer 236 is mounted on the shaft 122 forward of the propeller 222 and acts on the curved fingers 230 to bias the curved fingers to a retracted position as shown in FIG. 9a. The extent of the bias acting on the curved fingers 230 determines the upper threshold rate of descent at which the emergency braking device 100 triggers.

The finger restrainer 236 comprises a pair of coupled brackets 240 and 242 respectively. One of the brackets 240 has a circular passage 250 therein adjacent one of its ends and an upstanding rim 252 about the periphery of the passage 250. Tabs 254 are provided on opposite sides of the passage 250 and have holes provided therein. The other bracket 242 also has a circular passage 260 therein sized to surround the upstanding rim 252. Tabs 262 are provided on opposite sides of the passage 260 and have holes therein that are aligned with the holes on the tabs 254. Nut and bolt fasteners 270 extend between each pair of tabs 254 and 262 to secure the brackets 240 and 242 together. Springs 272 surround the fasteners 270 between the pairs of tabs 254 and 262.

An elongate slot 280 is provided in each bracket 240 and 242 adjacent its opposite end to limit outward radial movement of the curved fingers 230. A tab 282 is formed on each bracket 240 and 242 adjacent the elongate slot 280. A retaining element 286 comprising a shank 288 having a head 290 at one end and a threaded portion 292 at its opposite end passes through a hole in each tab 282 and through a retaining washer 294 abutting the tab 282. A nut and spacer arrangement 296 engages the threaded portion 292 of each shank 288 and a spring 298 surrounds each shank 288 between the retaining washer 294 and nut and spacer arrangement 296. A nut and bolt fastener 300 passes through each elongate slot 280, a central passage in each head 290 and an aligned hole in each curved finger 230 to couple the brackets 240 and 242 to the curved fingers 230.

The spring-loaded brake 108 as best seen in FIGS. 2 and 5 comprises a push block 400 slidably received in the upper frame section 102b. The push block 400 has a piston 402 extending from its rear surface 404 that passes through a passage in the rear wall of the upper frame section 102b and engages the trigger mechanism 112. Vertically spaced springs 410 act between the rear surface 404 of the push block 400 and the rear wall of the upper frame section 102b. The front surface of the push block 400 has a cut-out 412 therein that defines an inclined surface 414. The cut-out 412 accommodates a liner block 420 formed of low friction material that extends along the inclined surface 414. The liner block 420 presents an inclined forwardly directed surface 422 that cooperates with an inclined rear surface 426 of a braking rack 430. Mating formations (not shown) on the liner block 420 and the braking rack 430 cooperate to maintain the liner block 420 and braking rack 430 in abutment while permitting the braking rack 430 to slide along the inclined surface 422 of the liner block. The front surface of the braking rack 430 is fitted with a rack of teeth 432 complimentary to the rack 40. A stop 440 extends into the upper frame section 102b to limit forward sliding movement of the push block 400 towards the rack 40 on the mast 12.

The spring-loaded brake 108 is actuable between a cocked and loaded condition and a released condition. When the emergency braking device 100 is in the neutral disengaged condition as shown in FIGS. 2 and 5, the spring-loaded brake 108 is cocked and ready for deployment. In this condition, the springs 410 are substantially completely compressed as the push block 400 is held in a retracted position within the upper frame section 102b by the trigger mechanism 112. In the released condition, the springs 410 are able to expand thereby to push the push block 400, liner block 420 and braking rack 430 toward the rack 40 on the mast 12 to bring the braking rack 430 into engagement with the rack 40.

The trigger mechanism 112 as best seen in FIGS. 2 and 5 includes a lever 500 pivotally mounted on the rear wall of the upper frame section 102b. A keeper 502 is fastened to one end of the lever 500 and is held by the latch 170 when the emergency braking device 100 is in the disengaged neutral condition. The opposite end of the lever 500 is coupled to the piston 402 via a retaining pin 504.

In general, during normal operation, the emergency braking device 100 remains in the neutral disengaged condition as shown in FIG. 5. In the neutral disengaged condition, the latch 170 retains the keeper 502 and thus, the spring-loaded brake 108 remains cocked with the teeth 432 of the braking rack 430 laterally spaced from the rack 40 on the mast 12. The elongate platform 16 is therefore permitted to move up and down the mast 12 under control of the drive mechanism. When the elongate platform 16 descends the mast 40 at a rate exceeding the upper threshold limit, the centrifugal actuator 106 releases the spring-loaded brake 108 allowing the braking rack 430 to engage the rack 40 on the mast 12 and arrest downward movement of the elongate platform 16. The emergency braking device 100 also resets so that upward movement of the elongate platform 16 along the mast 12 following triggering of the emergency braking device 100 returns the emergency braking device 100 to the neutral disengaged condition. Further specifics of the emergency braking device operation will now be described with particular reference to FIGS. 5 to 9b.

When the elongate platform 16 moves along the mast 12, the rack 40 imparts rotation of the input gear 120 as a result of their mating engagement. Rotation of the input gear 120 in turn imparts rotation of the shaft 122. The spring-biased finger assembly 220, which is mounted on the shaft 122, rotates with the shaft. During downward movement of the elongate platform 16 along the mast 12, if the rate at which the elongate platform 16 descends the mast 12 is below the upper threshold limit, the centrifugal forces acting on the spring-biased finger assembly 220 are insufficient to overcome the bias of the springs 298 surrounding the shanks 288 of the retaining elements 286. The curved fingers 230 thus remain in the retracted condition shown in FIG. 9a with the tips of the curved fingers 230 spaced from the notched inner surface 216 of the ring 204. As a result, the spring-biased finger assembly 220 freely rotates within the ring 204.

Figure 9B:
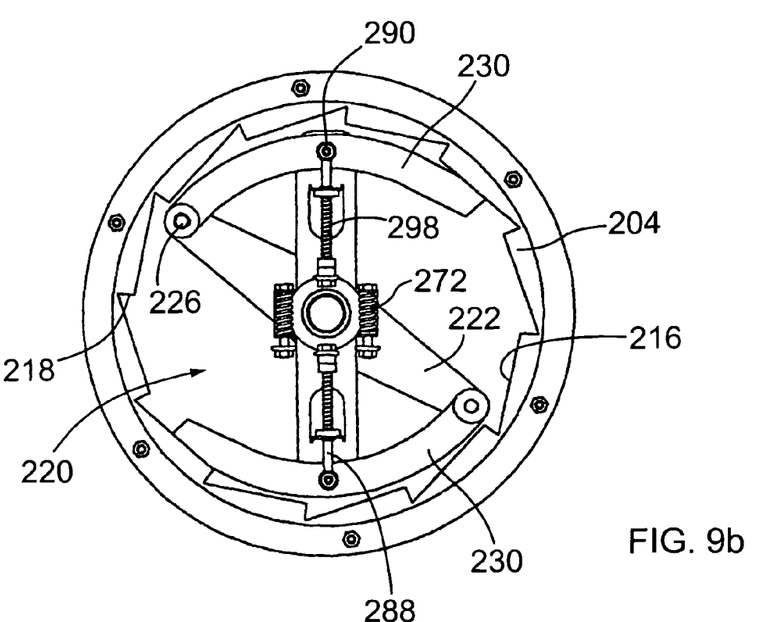

When the rate at which the elongate platform 16 descends the mast 12 exceeds the upper threshold limit, the centrifugal forces acting on the spring-biased finger assembly 220 are sufficient to overcome the bias of the springs 298. As a result, the curved fingers 230 pivot radially outwardly about the cylindrical projections guided by the movement of the fasteners 300 along the elongate slots 280. When this occurs, the tips of the curved fingers 230 bear against the inner surface 216 of the ring 204 and abut the steps 218 as shown in FIG. 9b preventing the spring-biased finger assembly 220 from rotating freely within the ring 204. With the shaft 122 locked to the drum assembly 110 at one end and the gear 120 at the opposite end, rotation of the gear 120 and shaft 122 results in rotation of the drum assembly 110 which in turn rotates the sleeve 132 and hence the toothed wheel 138.

Figure 6:
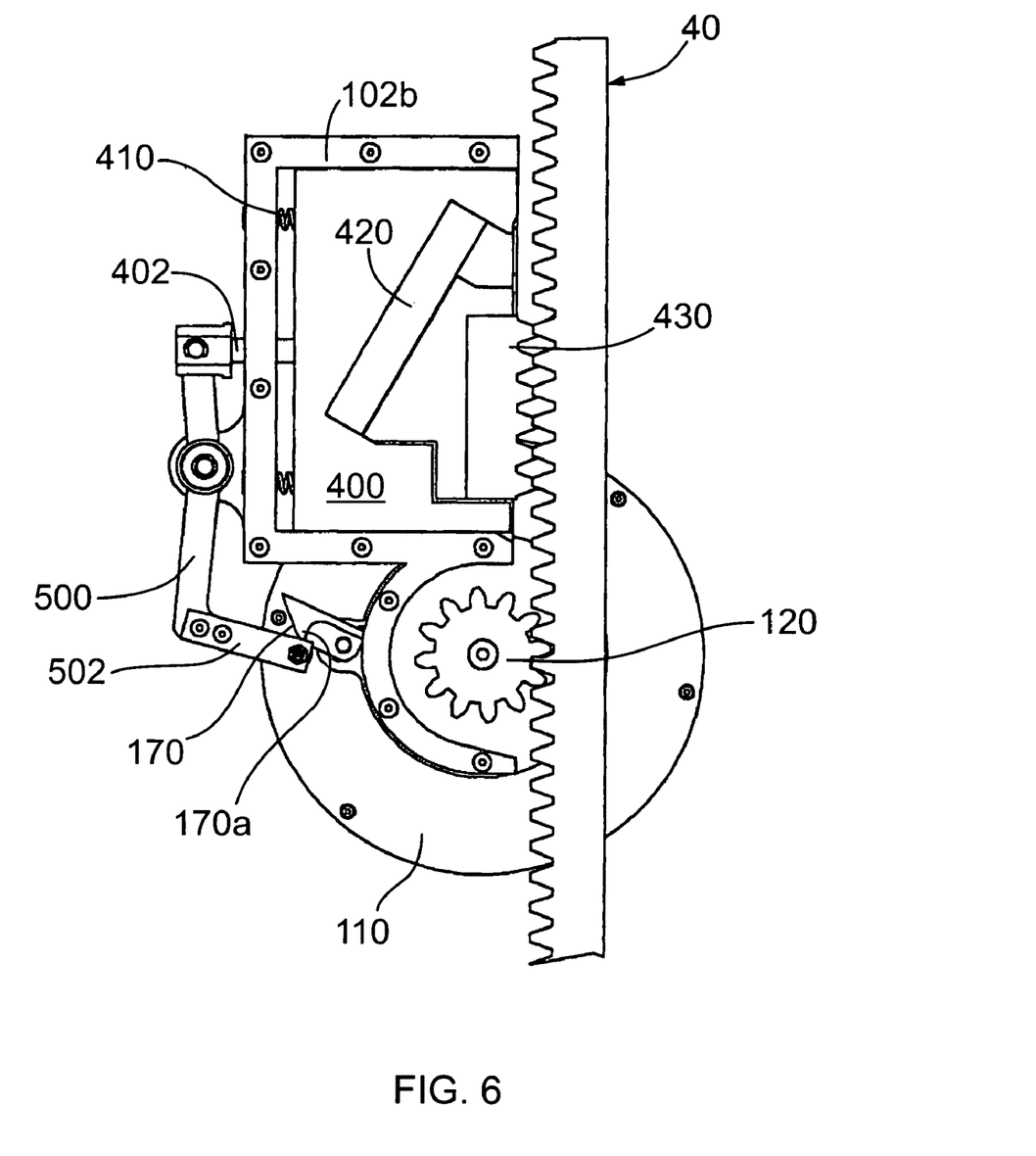
FIGS. 6 to 8 are side elevational views of the emergency braking device of FIG. 2 at different stages during movement to an engaged brake condition.
Figure 7:
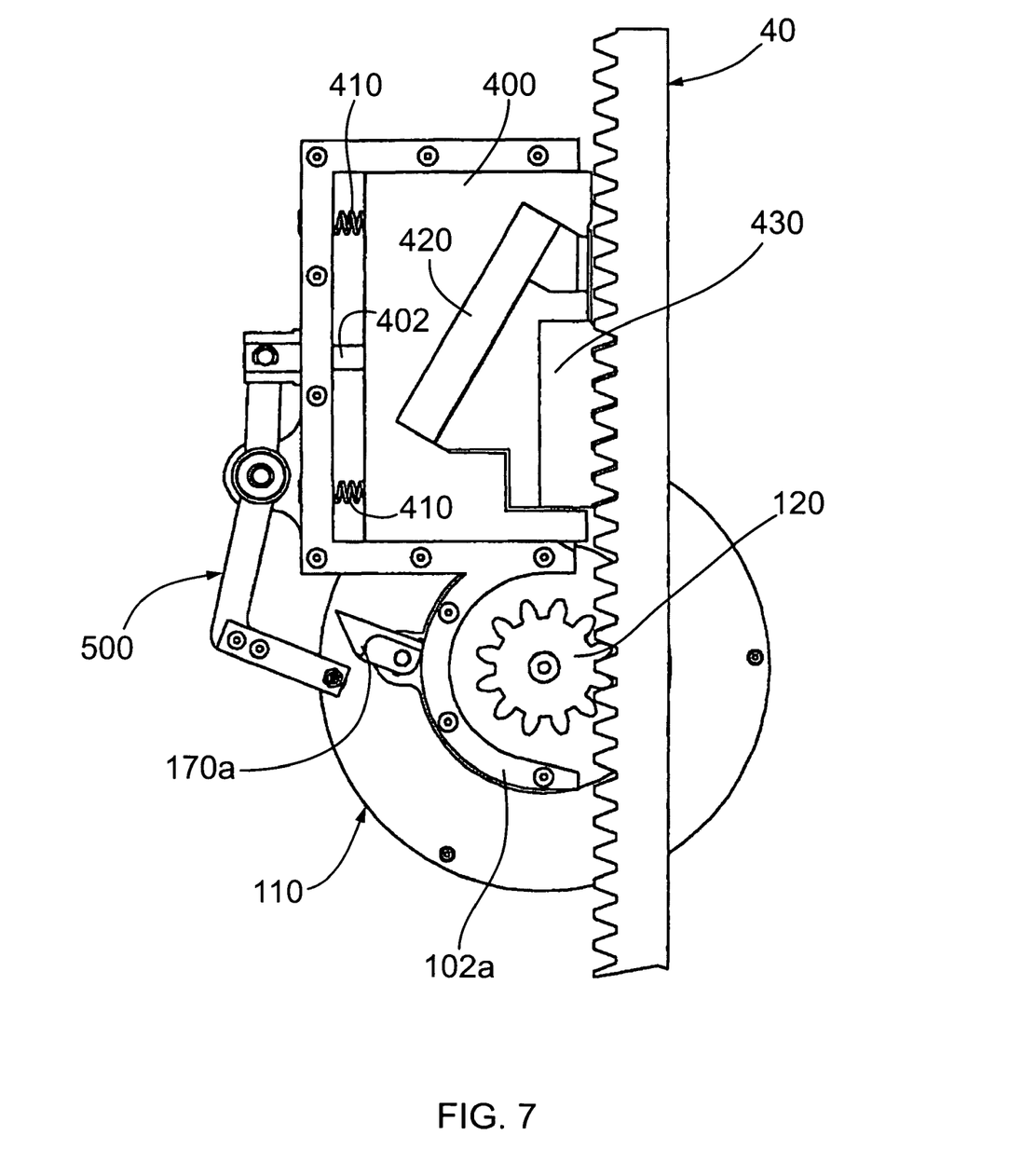

When the toothed wheel 138 rotates, the steps 142 on the outer surface 140 of the toothed wheel 138 engage the pawl 156 causing the pawl to pivot. Pivoting of the pawl 156 results in rotation of the shaft 154 and hence pivoting of the latch 170. When the latch 170 pivots, its catch 170a is brought out of engagement with the keeper 502 affixed to the lever 500 and thus, the lever is released. With the lever 500 released, the compressed springs 410 acting between the rear wall of the upper frame section 102b and the rear surface 404 of the push block 400 quickly expand thereby pivoting the lever 500 and pushing the push block 400 forwardly away from the rear wall of the upper frame section 102b as shown in FIG. 6. As the push block 400 moves forwardly, the inclined surface 422 of the liner block 420 bears against the inclined rear surface 426 of braking rack 430 and thus, pushes the braking rack 430 towards and into engagement with the rack 40 on the mast 12 as shown in FIG. 7. The release of the lever 500 is timed such that the teeth 432 of the braking rack 430 cleanly mesh with the teeth of the rack 40 as will be described.

Figure 8:
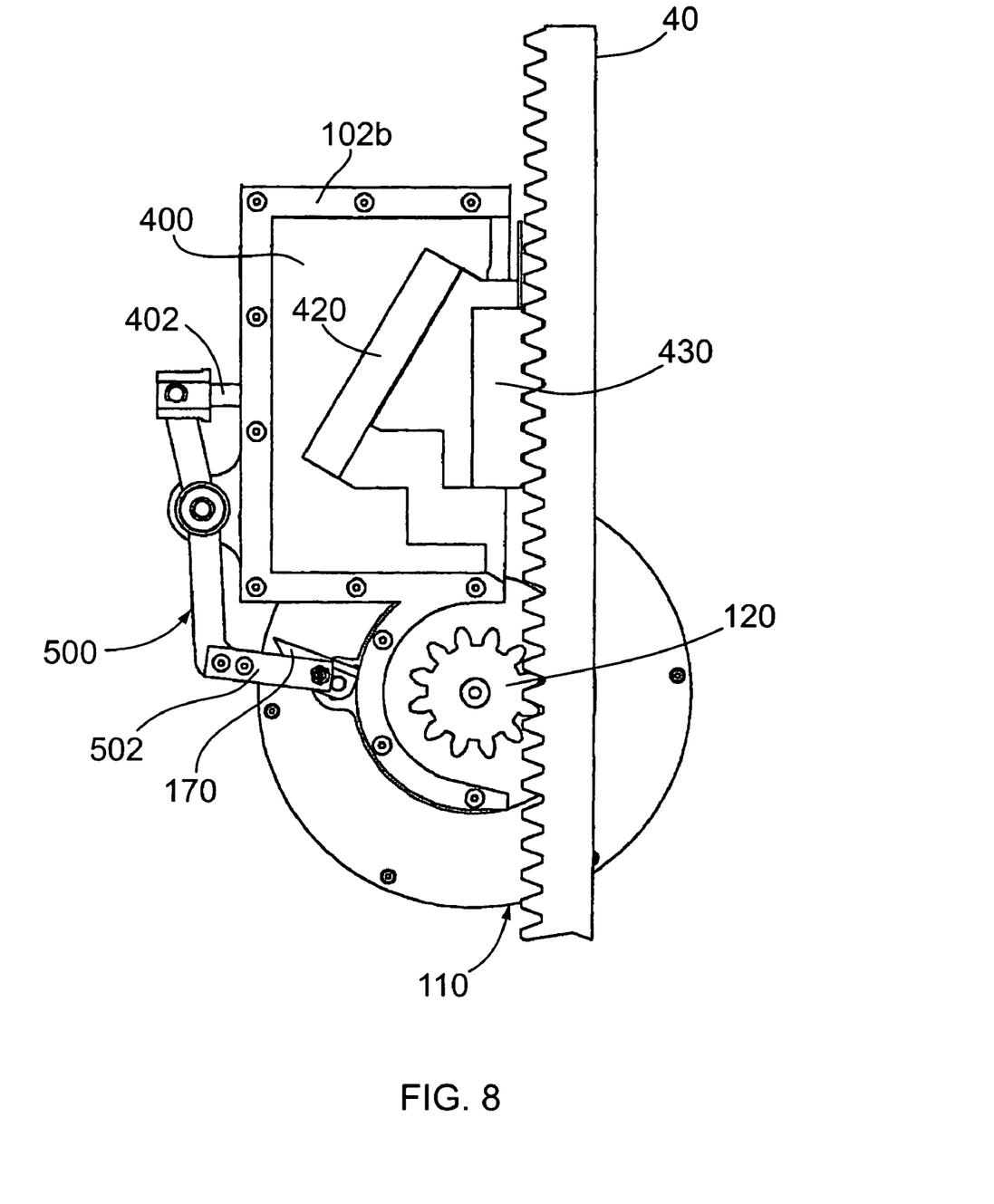

With the teeth 432 of the braking rack 430 in mating engagement with the teeth of the rack 40, as the elongate platform 16 descends, the inclined surface 422 of the liner block 420 bears downwardly against the inclined rear surface 426 of the braking rack 430, causing the braking rack to slide upwardly along the inclined surface 422 of the liner block 420. When the braking rack 430 reaches the top of the liner block 420, the push block 400 and braking rack 430 abut arresting any further downward movement of the elongate platform 16 relative to the mast 40 as shown in FIG. 8.

As the braking rack 430 slides upwardly along the inclined surface 422 of the liner block 420, the push block 400 is pushed back towards the rear wall of the upper frame section 102b. Movement of the push block 400 in this direction compresses the springs 410 and extends the piston 402 beyond the rear wall of the upper frame section 102b. As the piston 402 extends beyond the rear wall of the upper frame section 102b, the lever 500 is pivoted moving the keeper 502 towards the latch 170. The keeper 502 in turn pushes against the latch 170 causing it to pivot until the keeper 502 moves beyond the catch 170a of the latch at which time the latch 170 falls under the influence of gravity to reengage the keeper 502. In this manner, the spring-loaded brake 108 is returned to the cocked and loaded condition.

After deployment to arrest downward movement of the elongate platform 16 relative to the mast 12, when the elongate platform 16 is moved upwardly, the braking rack 430 through interaction between its teeth 432 and the teeth on the rack 40 and under the influence of gravity, slides downwardly along the inclined surface 422 of the liner block 420 automatically returning the emergency braking device 100 to the disengaged neutral condition.

To synchronize triggering of the braking rack 430 with the rack 40 on the mast 12 so that the teeth 432 of the braking rack 430 and the teeth of the rack 40 cleanly mesh, the relative radial position of the notches in the inner surface 216 of the ring 204 and teeth on the input gear 120 are equal. As a result, rotation of the tips of the curved fingers 230 matches the rotation of the teeth on the input gear 120. By ensuring the teeth of the braking rack 430 and the teeth of the rack 40 on the mast 12 mesh cleanly, potential free fall resulting from abutting teeth as opposed to meshing teeth and breaking of teeth is avoided. Using inclined surfaces to urge the braking rack 430 into engagement with the rack 40 also provides for better interaction between the teeth of the braking rack 430 and the teeth of the rack 40.

Figure 10A:
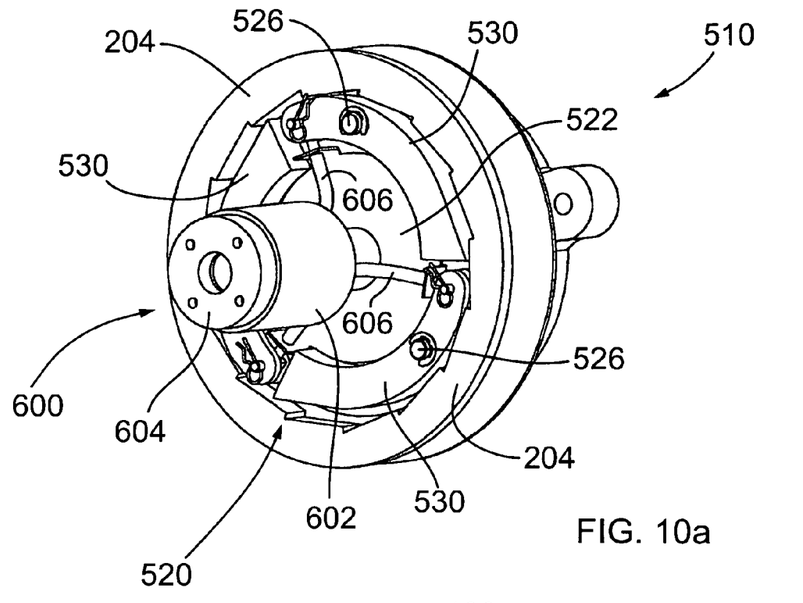
FIGS. 10a and 10b are isometric views of an alternative drum assembly for the emergency braking device.
Figure 10B:
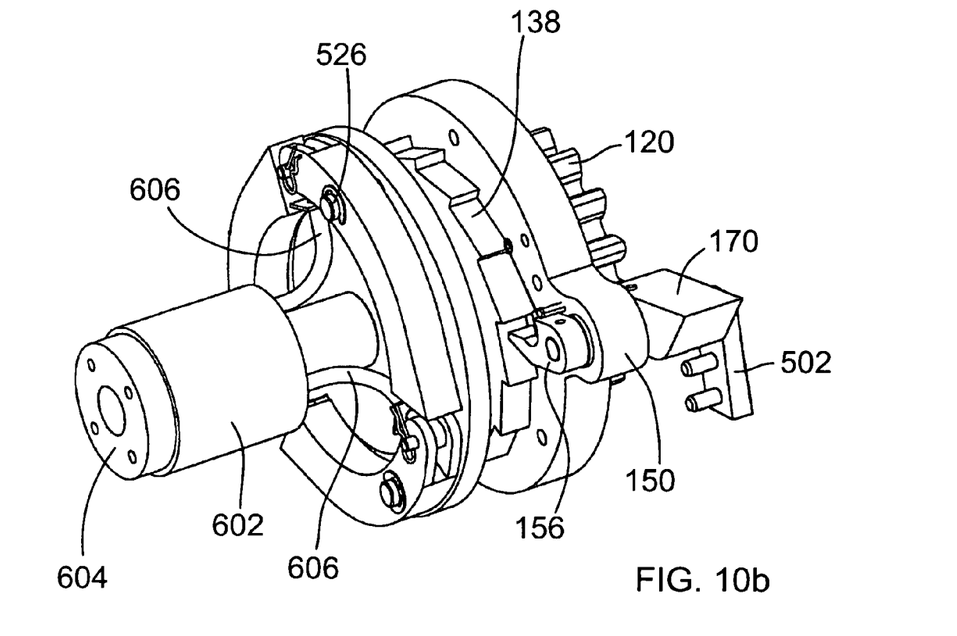

Turning now to FIGS. 10a and 10b an alternative drum assembly 510 for the emergency braking device is shown. In this embodiment, the drum assembly comprises a biased finger assembly 520 comprising three curved fingers 530 and an adjustment mechanism 600 acting on the biased finger assembly 520 that allows the rate of descent of the elongate platform 16 along the mast 12 at which the trigger mechanism 112 releases the spring-loaded brake 108 to be adjusted. In this embodiment, the curved fingers 530 are pivotally mounted on cylindrical projections 526 extending forwardly of a disc 522 mounted on the shaft 122. The adjustment mechanism 600 comprises a cylindrical canister 602 housing a spring (not shown) under compression. A cap 604 threadably engages the end of the canister 602 and bears against one end of the spring. The opposite end of the spring bears against a biasing plate (not shown) having projections extending into tubes 606 extending from the canister 602. Each tube 606 contains ball bearings (not shown) and extends to one end of an associated curved finger 530. A bearing plate (not shown) is provided at the end of the each tube 606 and bears against the end of its associated curved finger 530 to maintain the curved fingers in the retracted position. Each bearing plate also includes a projection (not shown) extending into its associated tube 606.

When the biased finger assembly 520 is rotated by the shaft 122 at a rate above the upper threshold limit, the centrifugal forces acting on the curved fingers 530 are sufficient to overcome the bias applied to the ends of the curved fingers by the spring, ball bearings and bearing plates resulting in the curved fingers pivoting and moving radially outwardly. As the curved fingers 530 move in this manner, the bearing plates at the ends of the tubes 606 are pushed back towards the tubes forcing the ball bearings backwards against the bias of the spring. Turning the cap 604 allows the spring in the canister 602 to be further compressed or released and this of course determines the extent of the centrifugal forces required to overcome the bias and hence sets the upper threshold limit at which the emergency braking device 100 is triggered.

Although embodiments have been described with reference to the accompanying drawings, those of skill in the art will appreciate that modifications and variations may be made without departing from the spirit and scope thereof as defined by the appended claims.

What is claimed is:

1. A braking device for an elevating platform assembly, said elevating platform assembly comprising a platform moveable along a generally vertical mast supporting an upright rack, said braking device comprising:
   an input gear assembly in mating engagement with said rack;
   a centrifugal actuator communicating with said input gear assembly and comprising a trigger mechanism; and
   a spring-loaded brake responsive to said centrifugal actuator to engage said rack and arrest said platform when said platform descends said mast at a rate above an upper threshold limit resulting in release of said trigger mechanism, said spring-loaded brake automatically resetting said trigger mechanism as downward movement of said platform is arrested.

2. A braking device according to claim 1 wherein said spring-loaded brake comprises a braking rack to engage the rack on said mast.

3. A braking device according to claim 2 wherein said centrifugal actuator times triggering of said spring-loaded brake so that the teeth of said braking rack cleanly mesh with the teeth on the rack of said mast.

4. A braking device according to claim 3 wherein said centrifugal actuator comprises a drum assembly coupled to said input gear assembly, said trigger mechanism acting between said input gear assembly and said spring-loaded brake, said drum assembly causing said input gear assembly to release said trigger mechanism thereby to deploy said spring-loaded brake when centrifugal forces sensed by said drum assembly signify a rate of descent of said platform above said upper threshold limit.

5. A braking device according to claim 4 wherein said drum assembly comprises a biased assembly rotatable with said input gear assembly, said biased assembly overcoming the bias when centrifugal forces thereon signify a rate of descent of said platform above said upper threshold limit resulting in release of said trigger mechanism.

6. A braking device according to claim 5 where the bias is adjustable.

7. A braking device according to claim 5 wherein said trigger mechanism comprises a lever coupled adjacent one end to said spring-loaded brake, said lever having a keeper adjacent its opposite end that is retained by a latch of said input gear assembly, said latch being released when the rate of descent of said elevating platform is above said upper threshold limit.

8. A braking device according to claim 7 wherein said input gear assembly comprises an input gear in mating engagement with said rack, a shaft coupled to said input gear and said biased assembly and a latch release mechanism responsive to movement of said biased assembly that occurs when said biased assembly overcomes said bias.

9. A braking device according to claim 8 wherein said drum assembly comprises a notched inner surface that is engaged by said biased assembly when said biased assembly overcomes said bias, engagement of said biased assembly and notched inner surface causing rotation of said drum assembly and actuation of said latch release mechanism.

10. A braking device according to claim 9 wherein the spacing of the notches on said inner surface and the spacing of teeth of said input gear are substantially equal.

11. A braking device according to claim 3 wherein said spring-loaded brake comprises a linearly slidable push block acting on said braking rack.

12. A braking device according to claim 11 wherein said push block presents an upwardly and forwardly inclined surface that acts on a complimentary surface of said braking rack.

13. A braking device according to claim 12 wherein said spring-loaded brake further comprises a low friction material acting between the inclined surface of said push block and the complimentary surface of said braking rack.

14. A braking device according to claim 13 wherein said braking rack is slidable along said low friction material.

15. A braking device according to claim 1 wherein the centrifugal actuator is adjustable to alter the upper threshold limit.

16. An elevating platform comprising:
    at least one mast;
    a vertical rack on said at least one mast;
    an elongate platform coupled to said at least one mast and moveable therealong;
    a drive mechanism acting between said platform and said mast to effect movement of said platform along said mast; and
    an emergency braking device on said platform and engaging said rack, said emergency braking device comprising:
       an input gear assembly in mating engagement with said rack;
       a centrifugal actuator communicating with said input gear assembly and comprising a trigger assembly; and
       a spring-loaded brake responsive to said centrifugal actuator to engage said rack and arrest said platform when said platform descends said mast at a rate above an upper threshold limit resulting in release of said trigger assembly, said spring-loaded brake automatically resetting said trigger mechanism as downward movement of said platform is arrested.

17. An elevating platform according to claim 16 wherein said spring-loaded brake comprises a braking rack to engage the rack on said mast.

18. An elevating platform according to claim 17 wherein said centrifugal actuator times triggering of said spring-loaded brake so that the teeth of said braking rack cleanly mesh with the teeth on the rack of said mast.

19. An elevating platform according to claim 18 wherein said spring-loaded brake comprises a linearly slidable push block acting on said braking rack.

20. An elevating platform according to claim 19 wherein said push block presents an upwardly and forwardly inclined surface that acts on a complimentary surface of said braking rack.

21. An elevating platform according to claim 20 wherein said spring-loaded brake further comprises a low friction material acting between the inclined surface of said push block and the complimentary surface of said braking rack.

22. An elevating platform according to claim 21 wherein said braking rack is slidable along said low friction material.

23. An elevating platform according to claim 16 wherein the centrifugal actuator is adjustable to alter the upper threshold limit.

24. A braking device for an elevating platform assembly, said elevating platform assembly comprising a platform moveable along a generally vertical mast supporting an upright rack, said braking device comprising:
    an input gear assembly in mating engagement with said rack;

a centrifugal actuator communicating with said input gear assembly; and a spring-loaded brake responsive to said centrifugal actuator to engage said rack and arrest said platform when said platform descends said mast at a rate above an upper threshold limit, said spring-loaded brake comprising a braking rack to engage the rack on said mast and a linearly slidable push block acting on said braking rack, wherein said push block presents an upwardly and forwardly inclined surface that acts on a complimentary surface of said braking rack.

25. A braking device according to claim 24 wherein said spring-loaded brake further comprises a frame accommodating said braking rack and said push block and at least one spring member acting between said frame and said push block to bias said push block towards said braking rack, said centrifugal actuator overcoming the bias when said platform descends said mast at a rate below said upper threshold limit.

26. A braking device according to claim 25 wherein said centrifugal actuator comprises a drum assembly coupled to said input gear assembly and a trigger mechanism acting between said input gear assembly and said spring-loaded brake, said drum assembly causing said input gear assembly to release said trigger mechanism thereby to deploy said spring-loaded brake when centrifugal forces sensed by said drum assembly signify a rate of descent of said platform above said upper threshold limit.

27. A braking device according to claim 26 wherein said spring-loaded brake further comprises a low friction material acting between the inclined surface of said push block and the complimentary surface of said braking rack.

28. A braking device according to claim 27 wherein said braking rack is slidable along said low friction material.

29. A braking device according to claim 26 wherein said push block and braking rack are configured to automatically reset the trigger mechanism as downward movement of said platform is arrested.

30. A braking device for an elevating platform assembly, said elevating platform assembly comprising a platform moveable along a generally vertical mast supporting an upright rack, said braking device comprising:

an input gear assembly in mating engagement with said rack;

a centrifugal actuator communicating with said input gear assembly and comprising a trigger mechanism; and a spring-loaded brake responsive to said centrifugal actuator to engage said rack and arrest said platform when said platform descends said mast at a rate above an upper threshold limit, said spring-loaded brake automatically resetting said trigger mechanism as downward movement of said platform is arrested, wherein said trigger mechanism comprises a lever coupled adjacent one end to said spring-loaded brake, said lever having a keeper adjacent its opposite end that is retained by a latch of said input gear assembly, said latch being released when the rate of descent of said elevating platform is above said upper threshold limit thereby to cause said trigger mechanism to release said spring-loaded brake.

* * * * *